W. C. PHILLIPS.
TRACTOR ATTACHMENT FOR AUTOMOBILES.
APPLICATION FILED APR. 5, 1919.
1,327,773.
Patented Jan. 13, 1920.
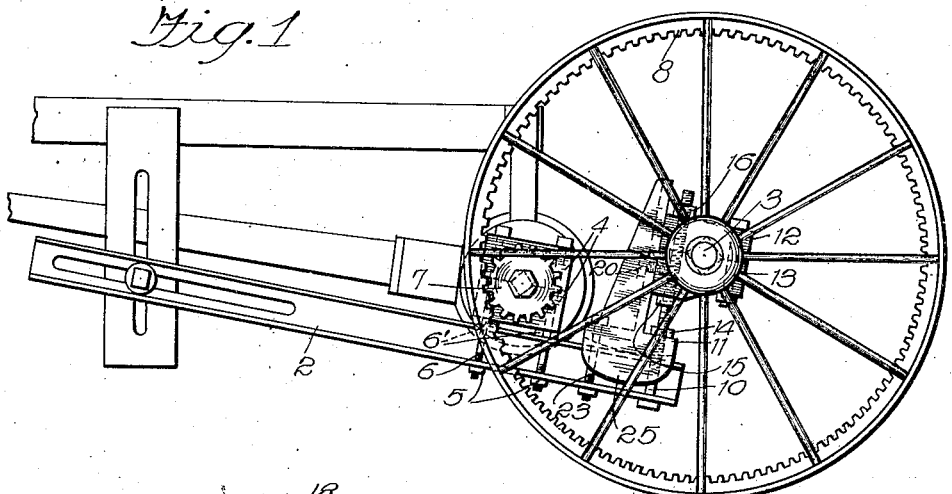
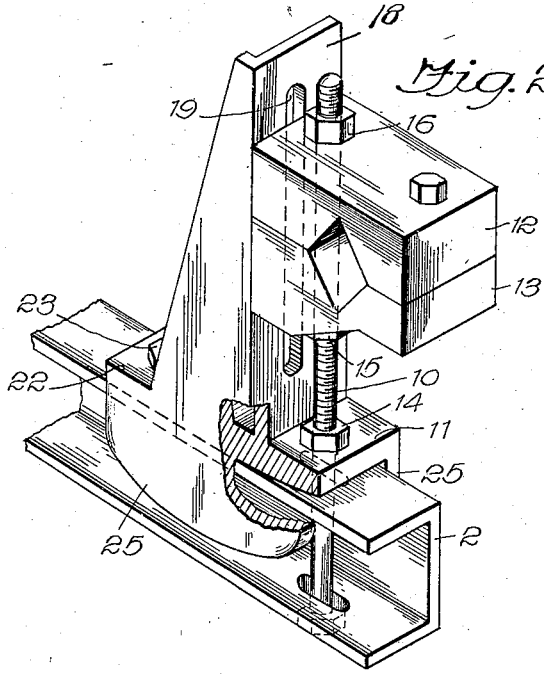
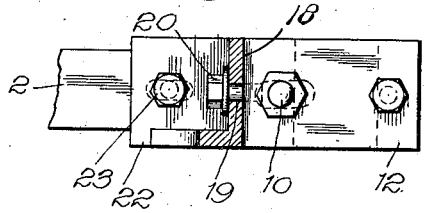
Witnesses:
Andrew Wintergorn
Robert P. Bracke
Inventor
Walter C. Phillips
By Williams, Bradbury & Lee
Attys.

UNITED STATES PATENT OFFICE.

WALTER C. PHILLIPS, OF CHICAGO, ILLINOIS, ASSIGNOR TO GUARANTEED TRACTORS, INC., OF CHICAGO, ILLINOIS, A CORPORATION OF ILLINOIS.

TRACTOR ATTACHMENT FOR AUTOMOBILES.

1,327,773.  Specification of Letters Patent.  Patented Jan. 13, 1920.

Substitute for application Serial No. 197,822, filed October 22, 1917. This application filed April 5, 1919. Serial No. 287,738.

*To all whom it may concern:*

Be it known that I, WALTER C. PHILLIPS, a citizen of the United States, residing at Chicago, in the county of Cook and State of Illinois, have invented a certain new and useful Improvement in Tractor Attachments for Automobiles, of which the following is a full, clear, concise, and exact description, reference being had to the accompanying drawings, forming a part of this specification.

My invention relates to an adjustable standard for use in converting automobiles into tractors. In order to convert an automobile into a tractor by the apparatus of which my invention forms a part, a pair of rear tractor wheels is mounted on a sub-frame which connects between the automobile rear axle and a bracket attached to the automobile frame. In order that the device may be marketed in shape to be attached to various makes of automobiles without the necessity of furnishing different supports of the type illustrated herein with each different make of automobile, it is necessary that the support be made adjustable so that the relation of the tractor axle may be adjusted with respect to the rear axle of the automobile.

My invention relates to the details by means of which the proper adjustment of the tractor axle may be had.

My invention is illustrated in the accompanying drawing, wherein Figure 1 is a side elevational view of the support of my invention in association with an automobile frame, rear axle, and tractor wheels; Fig. 2 is a perspective view of the means which I employ to adjustably secure my support to a tractor axle; and Fig. 3 is a plan view of Fig. 2.

The automobiles to which my invention is to be applied are provided with various height wheels and it is desirable to maintain the height of the rear automobile axle substantially the same after the automobile has been converted into a tractor as it was when driven as an automobile. This requires that the channel members 2 of the automobile sub-frame be made vertically adjustable with respect to the rear axle 3 of the tractor. It is likewise necessary, in order that certain brace rods, brake operating rods and the like may be avoided on certain makes of automobiles, that blocks 4, by means of which the channels 2 are attached to the rear axle housing of the automobile, be made vertically adjustable with respect to the channel 2. These blocks are preferably adjustable by the setting of the nuts 5 on the bolts 6, by means of which the clamping blocks 4 are attached to the channel 2, washers or other suitable fillers 6' being provided where it is desired to lower the channel 2 with respect to the rear axle of the automobile. In order that the pinion gear 7 may be set properly in mesh with the drive gear 8 for different vertical adjustments of the tractor axle 3 with respect to the channel 2, the upright by means of which the driving axle and the channel 2 are united must permit of a compound adjustment of the driving axle with respect to the channel 2 and with respect to the automobile rear axle and the pinion 7.

In accordance with my invention this compound adjustment is accomplished by means of the lead screw 10 which passes through the lower and upper horizontal members of the channel 2 through the base member 11 of the standard and through the upper and lower tractor axle clamping members 12 and 13. This lead screw is provided with a nut 14 immediately above the base member 11, and with nuts 15 and 16 below and above the tractor axle clamping members 12 and 13. The rear axle clamping member 12 is provided with a threaded hole in the face which registers with the face 18 of the standard, the standard being provided with a slot 19 and a stud bolt 20 being passed through the slot and threaded into the opening in the block 12 by means of which the block 12 may be securely clamped to the standard when the position of the rear axle is properly determined. The forward lug 22 of the standard base is provided with a bolt 23 which extends through openings in the upper and lower flanges of the channel 2. The base of the standard is slightly rounded to form a rocker upon which the standard may be tilted either to the front or to the rear by the relative adjustments of the nuts on the bolts 10 and 23. By means of this adjustment, after the proper height has been determined for the tractor axle with respect to the channel 2, and consequently with respect to the rear axle of the automobile, the nuts on bolts 10 and 23 are adjusted so that the pinion 7 is caused to mesh properly with the teeth of the drive wheel 8. In order to assist in the proper positioning of the standard with respect to the channel 2, the standard is preferably provided with one or more depending limbs 25, which bear against either one or both sides of the channel member.

This application is a substitute for my application Serial No. 197,822, filed October 22, 1917.

While I have shown and described my invention with respect to the details illustrated in the accompanying drawings, it is to be understood that certain modifications thereof may be made without departing from the spirit or scope of my invention.

I claim:

1. In a device for transforming an automobile into a tractor, the combination with a sub-frame, of means for attaching the sub-frame to the rear axle housing of the automobile, a standard at the rear of said sub-frame, a tractor axle clamp carried on said standard, and means the actuation of which positively moves said clamp vertically properly to adjust the tractor axle with respect to said sub-frame.

2. In a device for converting an automobile into a tractor, the combination with a sub-frame, of means for attaching the sub-frame to the nether side of the rear axle housing of the automobile, a standard at the rear of the sub-frame, and a lead screw extending vertically at one side of said standard, a tractor axle clamp carried by the standard, and means engaging said lead screw and adapted to be operated to adjust said tractor axle clamp vertically with respect to said sub-frame.

3. In a device for converting an automobile into a tractor, the combination with a sub-frame, of means for uniting said sub-frame to the rear axle housing of the automobile, a standard on said sub-frame, means for securing the upper part of said standard to the tractor axle, and means for tilting said standard either forward or back for adjusting the distance between the tractor axle and the axle of the automobile.

4. In a device for converting an automobile into a tractor, the combination with a sub-frame, of a device for attaching the rear axle housing of the automobile to said sub-frame, means carried by the sub-frame for attachment to the tractor axle, and means the actuation of which positively moves the point of attachment with the tractor axle both vertically and horizontally.

5. In a device for converting an automobile into a tractor, the combination with a sub-frame of means for attaching said sub-frame to the rear axle housing of the automobile, a standard on the sub-frame, devices for securing the standard to the tractor axle, and means for tilting said standard either forward or back for adjusting the distance between the tractor axle and the axle of the automobile, said means comprising a fulcrum interposed between said standard and said sub-frame.

6. In a device for converting an automobile into a tractor, the combination with a sub-frame of means for securing said sub-frame to the rear axle housing of the automobile, a standard mounted on said sub-frame and devices for securing said standard to the tractor axle, means for tilting said standard forward or back, and positive locking means for securing said standard in its adjusted position.

7. In a device for converting an automobile into a tractor, the combination with a sub-frame of means for securing said sub-frame to the rear axle housing of the automobile, a standard mounted on said sub-frame and devices for securing said standard to the tractor axle, means for tilting said standard forward and back, and positive locking means on either side of said fulcrum for securing said standard in its adjusted position.

8. In a device for converting an automobile into a tractor, the combination with a sub-frame of means for securing said sub-frame to the rear axle housing of the automobile, a standard mounted on said sub-frame and devices for securing said standard to the tractor axle, means for tilting said standard forward or back, and positive locking means for securing said standard in its adjusted position, said means comprising a lead screw extending vertically on one side of said standard, and a bolt extending vertically on the other side thereof.

9. In a device for converting an automobile into a tractor, the combination with a sub-frame, of means for uniting said sub-frame to the rear axle housing of the automobile, a standard on the sub-frame, means for securing the upper part of said standard to the tractor axle, means for tilting said standard either forward or back for adjusting the distance between the tractor axle and the axle of the automobile, said means comprising a convex lower surface on said standard adapted to engage said sub-frame, and locking means provided on either side of said standard.

In witness whereof I hereunto subscribe my name this 2nd day of April, 1919.

WALTER C. PHILLIPS.

Witnesses:
ANDREW WINTERCORN,
MARY A. COOK.